(12) United States Patent
Brown et al.

(10) Patent No.: US 6,740,280 B1
(45) Date of Patent: *May 25, 2004

(54) TIRE CONSTRUCTION METHOD FOR IMPROVING TIRE UNIFORMITY

(75) Inventors: Robert Walter Brown, Medina, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/545,929

(22) Filed: Apr. 10, 2000

(51) Int. Cl.⁷ ................................................ B29C 35/00
(52) U.S. Cl. ........................ 264/326; 264/315; 264/487
(58) Field of Search ................................ 264/340, 326, 264/315, 501, 486, 487; 156/133, 123

(56) References Cited

U.S. PATENT DOCUMENTS

| | | |
|---|---|---|
| 2,963,737 A | 12/1960 | Soderquist |
| 3,034,839 A | 5/1962 | Schoos |
| 3,039,839 A | 6/1962 | Waters et al. |
| 3,389,193 A | 6/1968 | Hughes |
| 3,464,264 A | 9/1969 | French |
| 3,529,048 A | 9/1970 | Kovac et al. |
| 3,529,148 A | 9/1970 | Stefano et al. |
| 3,632,701 A | 1/1972 | Devitt et al. |
| 3,635,610 A | 1/1972 | Hall et al. |
| 3,725,163 A | 4/1973 | Hofelt, Jr. |
| 3,739,533 A | 6/1973 | Iida et al. |
| 3,838,142 A | 9/1974 | Hochstein |
| 3,848,368 A | 11/1974 | Toshioka et al. |
| 3,865,527 A | 2/1975 | McGehee et al. |
| 3,872,208 A | 3/1975 | Brown et al. |
| 3,880,556 A | 4/1975 | Brown et al. |
| 3,926,704 A | 12/1975 | Sharp, Jr. |
| 3,945,277 A | 3/1976 | McGehee et al. |
| 3,948,004 A | 4/1976 | Gruber |
| 4,053,265 A | * 10/1977 | Wulker et al. |
| 4,078,339 A | 3/1978 | Ongaro |
| 4,095,374 A | 6/1978 | Ugo |
| 4,171,641 A | 10/1979 | Landsness |
| 4,173,850 A | 11/1979 | Gormish et al. |
| 4,420,453 A | 12/1983 | Ayers |
| 4,458,451 A | 7/1984 | Rogers et al. |
| 4,458,526 A | 7/1984 | Doi et al. |
| 4,536,054 A | 8/1985 | Wallner et al. |

(List continued on next page.)

FOREIGN PATENT DOCUMENTS

| | | |
|---|---|---|
| EP | 0552468 | 1/1993 |
| EP | 0888872 | 1/1999 |
| JP | 61-69437 | * 4/1986 |
| WO | WO98/05937 | 2/1998 |
| WO | WO00/11445 | 3/2000 |

Primary Examiner—Mathieu D. Vargot
(74) Attorney, Agent, or Firm—Howard M. Cohn

(57) ABSTRACT

The invention relates to a method of manufacturing a pneumatic tire (400) with improved tire uniformity. The tire has a pair of beads (432a,432b) in bead portions and at least one carcass ply (418) extending between the beads and consisting of reinforcement cords (419) embedded in a rubber matrix (836). The method is characterized by the steps of: a) forming the rubber matrix of the carcass ply or a portion of the bead portions from a matrix material (such as a thermoplastic) that can be rendered plastic and rendered non-plastic, which respectively permits and restricts reorientation of the reinforcement cords, b) rendering the matrix material plastic (such as by heating the thermoplastic) before the tire begins to cure to permit the one or more of the reinforcement cords to be free to reorient themselves, and c) curing the tire in a tire mold (354) while the matrix material remains plastic so that the reinforcement cords remain free to reorient themselves while curing.

17 Claims, 7 Drawing Sheets

U.S. PATENT DOCUMENTS

| | | |
|---|---|---|
| 4,654,253 A | 3/1987 | Brown et al. |
| 4,736,546 A | 4/1988 | Ugo |
| 4,763,468 A | 8/1988 | Brown et al. |
| 4,790,365 A | 12/1988 | Sandstrom et al. |
| 4,934,431 A | 6/1990 | Agari et al. |
| 5,022,186 A | 6/1991 | Rogers, Jr. |
| 5,058,647 A | 10/1991 | Gartland et al. |
| 5,060,510 A | 10/1991 | Rousseau |
| 5,103,669 A | 4/1992 | Kato |
| 5,309,971 A | 5/1994 | Baker et al. |
| 5,365,781 A | 11/1994 | Rhyne |
| 5,407,521 A | 4/1995 | Falvard |
| 5,458,176 A | 10/1995 | Rhyne |
| 5,616,859 A | 4/1997 | Rhyne |
| 5,639,962 A | 6/1997 | Maloney |
| 5,756,589 A | 5/1998 | Sandstrom et al. |
| 5,853,648 A | 12/1998 | Cleveland |
| 5,882,452 A | 3/1999 | Sakamoto et al. |
| 5,901,863 A | 5/1999 | Riga et al. |
| 6,098,511 A * | 8/2000 | Rothemeyer et al. |

* cited by examiner

TIRE CONSTRUCTION METHOD FOR IMPROVING TIRE UNIFORMITY

CROSS-REFERENCE TO RELATED APPLICATIONS

Attention is directed to commonly-owned, copending PCT/US99/24283 and PCT/US99/24449, both filed Oct. 18, 1999.

This application also relates to copending application Ser. No. 09/510,859 entitled TIRE AND METHOD FOR CORRECTING TIRE UNIFORMITY THEREOF and copending application Ser. No. 09/511,546 entitled METHOD AND TIRE ADAPTED FOR POST CURE TIRE UNIFORMITY CORRECTION both filed Feb. 23, 2000.

TECHNICAL FIELD

The present invention relates to a method of manufacturing pneumatic tires, and, more specifically, to a method of improving tire uniformity during the tire manufacturing process.

BACKGROUND OF THE INVENTION

A typical pneumatic radial tire includes a tread, a belt structure and a carcass. The carcass has a pair of inextensible beads, one or more plies extending between and wrapping around the beads, two sidewalls, and an apex (rubber filler) over each bead.

In the tire manufacturing process, a green tire carcass ("green" meaning as yet uncured and still tacky) is built by wrapping a length of green innerliner and at least one radial ply over a "first stage building drum" (or "building mandrel") and splicing the innerliner and ply ends together to form a cylindrical shape around the building drum. Two beads (each comprising a cable of steel filaments encased in green rubber) are then positioned over the ply, one near each side, and the ply is expanded radially outward to tighten against the beads. The portions of the plies that extend outward, beyond the beads are then turned up (wrapped around) the beads, forming "turnups". Then, green (uncured) sidewalls are applied around each side of the plies.

There are two methods of incorporating the apexes during the tire-making process. In the "pre-apexing" method, an apexing machine adheres (pre-assembles) an annular cross-sectional apex to each annular bead before the bead is positioned over the ply on the building drum. In the "flat application of apex" method, each apex is circumferentially laid down flat, as a triangular strip of green rubber ("gum strip"), onto the ply, next to a bead, so that one of the apex's tacky sides adheres to the tacky green ply.

The resulting assembly, called a green tire "carcass", typically comprising innerliner, ply, beads, apexes, sidewalls, and other components such as chippers and flippers, is removed from the first stage building drum and mounted on a "second stage machine" where it is inflated ("blown up") to a toroidal shape, and the radially-outer surface of the carcass is pressed against a green (uncured) tread and a belt package to form a "green tire". Then, the green tire is stitched (rolled with a roller) to remove air pockets and adhere internal surfaces together.

The resulting green tire is then mounted in a curing (vulcanization) mold, where a bladder is blown up within the tire cavity to press the tire's outer surface tightly against the mold's inner walls while the tire is vulcanized. In the mold, the tire's green rubber initially softens under heat but eventually cures (stiffens through polymerization) enough to be removed from the mold and allowed to cool outside the mold where the curing reaction continues until the tire is cool. In some cases, the tire is kept inflated on a "post-cure inflation stand" while cooling, to keep the tire shape uniform and the ply uniformly stretched, to prevent the ply from shrinking nonuniformly when the tire is still hot from the mold.

After a tire is cured, it is typically tested for uniformity on a force variation machine (also called "tire uniformity machine", "tire uniformity inspecting machine" and "tire uniformity apparatus"). The patent literature is rich with creative designs for force variation machines and their components. Almost all force variation machines share the same general principle as follows:

The tire is mounted on a rotatable test rim. The tire is inflated and pressed against a drum (called "load-wheel", "load roll", "loading drum", or "test drum") whose axis is parallel with the tire axis. As the tire rotates against the drum, force sensors connected to the drum's shaft measure changes in force (of the tire against the drum) in various directions (radial, axial and tangential to the tire-drum interface) as the tire rotates.

Graphs of force (from the sensors) vs. tire rotational angle are mathematically processed to yield different uniformity characteristics, each uniformity characteristic defining a different type of tire uniformity. Some uniformity characteristics are radial runout, radial force variation, axial force variation, tangential force variation, wobble, and conicity. These terms are defined in the Definition Section below.

Tire nonuniformity emanates from numerous factors in the tire making process. They are listed below in order of their occurrence in tire building sequence:

a) Deformation While On Rolls: The raw tire components (tread, sidewall innerliner, plies, beads and belts) either are rubber or have a rubber matrix and are stored on long rolls in the deformable green state. So, the tire components may be not remain uniformly thick during storage.

b) Nonuniform Placement On Building Drum: The ply cords may not be laid around the building drum with equal straightness and tension, and the two beads may not be positioned perfectly parallel (relative to each other) over the ply on the building drum.

c) Nonuniform Placement On Second Stage Machine: On the second stage machine, if the belt and tread are not positioned symmetrically over the green carcass, the green tire, and hence cured tire, will not be uniform. Later, as the green rubber is blown up, the bead and ply positions can shift nonuniformly.

d) Components Shift In The Green Tire State: Before curing, the beads and plies are held in place only by their green rubber matrix and the surrounding green rubber. As the green tire is handled, the bead and ply positions can shift nonuniformly.

e) Nonuniform Mounting In The Mold: If the green tire is not positioned symmetrically within the mold, the finished tire will not be uniform.

f) Ply Splice: The ply is stiffer at its splice (where it is doubled over itself) than at other locations causing irregularities in construction.

g) Ply Stretching and Shrinkage: In the mold, the inflated bladder tensions (stretches) the ply outward, and the ply cords, if constructed of nylon or polyester fibers, can shrink when heated, thus tensioning the ply further. Under tension, the ply slips around the bead, possibly to a different extent at different locations around the bead, and a splice slips around the bead least.

h) Nonuniform Curing: The rubber can "lock up" (stiffen under cure) around the ply at different times at different locations, thus causing nonuniform ply stress.

Post-Cure Methods of Correcting Nonuniformity
Grinding Selected Locations

In the patent literature, the most commonly addressed method of correcting a uniformity characteristic is grinding off rubber from selected locations around the tread circumference. Numerous patents disclose a wide variety of methods, differing in how the grinder is interfaced with the force variation machine, how the grinding location (angular position) is determined based on force variation results, and which part of the tread (shoulder, crown, etc.) to grind. Disadvantages of grinding are that it contributes to environmental waste, reduces tread life, and leaves an unattractive surface finish.

Rotating Uninflated

U.S. Pat. No. 5,853,648 discloses rotating a tire in a vertical position, uninflated, while cooling after vulcanization.

Heating Selected Portions

U.S. Pat. Nos. 3,632,701; 3,865,527; 3,872,208 and 3,945,277 disclose various methods of reducing nonuniformities and/or flat spots of a cured uninflated tire based on heating only selected portions of the tire.

Post-inflation

Various patented methods of improving uniformity of a cured tire are based on "post-inflation", i.e., U.S. Pat. Nos. 2,963,737 and 4,420,453), defined as mounting the hot cured tire on a rim and keeping it inflated as it cools. The patented methods differ as to the inflation pressure and when to start and end the post-inflation.

Rotatingly Pressing Around Tire's Entire Circumference when Hot

U.S. Pat. Nos. 3,529,048; 3,464,264; 3,635,610; and 3,389,193 disclose various methods to improve uniformity characteristics, all based on rotating a cured tire while pressing it against a roller, to "run in", "knead", and/or "buckle" the tire's surface around its entire circumference, to alleviate nonuniform stresses. The patents differ as to whether this is done when the tire is still hot from the mold, reheated, or made hot by flexural heating. They also differ as to whether this is done while the tire is inflated or uninflated.

Ionizing Radiation

U.S. Pat. No. 3,838,142 discloses correcting radial force variation by irradiating sections of the tread and/or sidewalls with ionizing radiation of high energy electrons.

Material Addition

U.S. Pat. No. 3,725,163 discloses reducing force variations by applying a small amount of adhering material to selected locations of the tread.

Shims

U.S. Pat. No. 5,060,510 discloses correcting radial force variation by inserting circular ring wedges of circumferentially-variable thickness (serving as shims) between the rim and the tire's bead area.

Stretch Ply Cords

U.S. Pat. No. 5,365,781 (and its divisions U.S. Pat. Nos. 5,616,859 and 5,4581,176), disclose a method and apparatus to correct uniformity characteristics in a cured radial tire by permanently lengthening a portion of a carcass reinforcing member (i.e. selected ply cords) as a function of the magnitude of the uniformity characteristic. A significantly high inflation pressure permanently stretches the portion of the carcass reinforcing member: above its elastic limit and permanently lengthens it to an extent that is inversely related to a restraint (applied by a restraint ring) at that location. An alternative embodiment corrects force variation by mechanically (instead of by inflation pressure) stretching the portion of the carcass reinforcing member outwardly beyond its elastic limit. Disadvantages of this method are that the excessive stretching and permanent deformation may reduce the ply's strength, fatigue resistance, and adhesion to the rubber, and may excessively stress the beads.

Post Cure Inflation with Variable Rim Width or Inflation Pressure

European Patent No. 888,872 discloses measuring a waveform of radial runout before vulcanization. In a first embodiment, immediately after vulcanization, the tire is post cure inflated (to elongate the ply cords) at a high temperature on a rim whose rim width is minimum at a location corresponding to the wave form peak. In a second embodiment, immediately after vulcanization, the tire is post cure inflated (to elongate the ply cords) at a high temperature, while restraining jigs are disposed against the tire shoulders.

Pre-cure Methods of Correcting Nonuniformity

All of the aforementioned prior art methods entail improving tire uniformity (or correcting a uniformity characteristic) after curing. It is undesirable to manufacture a tire that is nonuniform, only to correct it later, especially after it has cooled down. It is more desirable for a tire to already be uniform as it exits the mold.

The following prior art methods improve or correct uniformity before curing.

a) Adjust Belt Position over Green Carcass

U.S. Pat. No. 3,926,704 discloses measuring conicity of an unvulcaized (green) tire and adjusting the location of the belts accordingly while on a tire building machine.

b) Adjust Tire Shaping when Green

U.S. Pat. No. 5,882,452 discloses measuring vertical deviation of a green tire from circularity while clamped on a green tire building drum, and then shaping the green tire into a complete circle according to the measured value.

c) Reduce Bead Spacing and Post-cure Inflate

U.S. Pat. No. 3,039,839 discloses a method of solving tire shrinkage and distortion caused by shrinkage of nylon ply cords. The bead set (bead spacing when on the building drum) is narrowed (relative to the prior art) to increase the molding stretch during molding and impart a tire molding stretch to the cords. After molding, the tire is promptly mounted on an inflating rim (posture inflation stand) and kept inflated until it cools to below the nylon cord's shrinkage temperature.

Disadvantages of Pre-cure Methods

The first two pre-cure methods (of '704 and '452) have the disadvantages of requiring a uniformity measurement procedure and requiring a corrective procedure that is specific for each tire. The third pre-cure method (of '839) has the disadvantage of imposing a relatively high ply stretch that improves tire uniformity at the expense of other tire characteristics.

Prior Art Disclosing a Layer Around the Bead

PCT/US99/24283 entitled IMPROVEMENTS IN BEAD CONSTRUCTION and related PCT/US99/24449 entitled AN IMPROVED PROCESS FOR MANUFACTURING TIRES both by Van Hoose and both having a common assignee with the present invention disclose an improved tire manufacturing process incorporating a tire having a cross-sectionally circular bead member comprising a rubber filler annulus and a bead wire annulus, surrounded by a thermoplastic cover. A tire manufactured with this process has reduced flow cracks and internal stresses.

U.S. Pat. No. 5,309,971 discloses a bead assembly having a rubber bead filler 84 (apex) and a reinforced rubberized ply flipper 86 that partially envelopes the bead and part of the bead filler. U.S. Pat. No. 4,934,431 (see FIG. 3) discloses a bead filler 6 (apex) disposed above a ring of bead wire 3 (bead) and a "bead reinforcing layer 8 disposed within the folded portion of the carcass 4 and extending about the bead wire 3" wherein the reinforcing layer 8 may be composed of cords of carbon fiber with a rubber latex adhesive. U.S. Pat. No. 3,163,683 discloses a tire bead assembly having a bead core 12, an apex 14 and a gum tie strip 16 of uncured rubber.

SUMMARY OF THE INVENTION

The invention relates to a method of manufacturing a pneumatic tire with improved tire uniformity. The tire has a pair of spaced beads and at least one carcass ply, extending between the beads and consisting of reinforcement cords embedded in a rubber matrix. The method is characterized by the steps of: a) forming the rubber matrix from a matrix material (such as a thermoplastic) that can be rendered plastic and rendered non-plastic, which respectively permits and restricts reorientation of one or more of the reinforcement cords relative to other materials or components of the tire, b) rendering the matrix material plastic (such as by heating the thermoplastic above its deflection temperature) before the tire begins to cure to permit the one or more of the reinforcement cords to be unrestricted and free to reorient themselves, and c) curing the tire in a tire mold while the matrix material remains plastic so that the reinforcement cords remain unrestricted and free to reorient themselves while curing within the mold so that the reinforcement cords maintain or attain a uniform tension. There can be a later step of: d) rendering the matrix material nonplastic (such as by cooling to below the deflection temperature) to restrict further reorientation of the one or more reinforcement cords subsequent to removing the tire from the tire mold.

If the matrix material is a thermoplastic, its deflection temperature is preferably above 30 degrees C., and more preferably between 121–190 degrees C. Heating of the thermoplastic can occur while within the mold. The thermoplastic can be sulfur vulcanizable, semi-sulfur vulcanizable or non sulfur vulcanizable thermoplastics. The reinforcement cords can be aramid (e.g., Kevlar™), steel, rayon, polyester or nylon.

Optionally, a portion of the bead portions can be comprised of the matrix material. For example, the thermoplastic material can be disposed between a bead and an adjacent portion of the carcass ply. Rendering the thermoplastic material plastic can permit the one or more reinforcement cords to slip with respect to a component of the tire, such as the beads.

Another method entails improving uniformity of a pneumatic tire having a pair of beads in bead portions and at least one carcass ply having reinforcement cords extending between the beads. The method is characterized by the steps of: a) forming at least a portion of the bead portions from a material (such as a thermoplastic) that can be rendered plastic and rendered non-plastic to respectively permit and restrict reorientation of one or more reinforcement cords relative to other reinforcement cords or components of the tire before the tire has been at least partially vulcanized, b) rendering the material plastic (such as by heating the thermoplastic above its deflection temperature) before the tire begins to cure to permit the reinforcement cords to reorient themselves; and c) curing the tire is a tire mold while the material remains plastic so that one or more of the reinforcement cords can reorient themselves during the curing within the mold so that the reinforcement cords maintain or acquire a uniform tension. The reorientation can be through the reinforcement cords slipping with respect to the beads. The material (that can be rendered plastic and nonplastic) can comprise the rubber matrix of the beads.

The thermoplastic preferably has a deflection temperature between 30–190 degrees C., and can be sulfur vulcanizable, semi-sulfur vulcanizable or non sulfur vulcanizable thermoplastics. The thermoplastic material can be disposed as a layer at least partially around the beads.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity.

In the drawings, the hundredth's place of each reference number usually matches the figure number, and similar elements are usually referred to by similar reference numbers. For example, element 199 in FIG. 1 and element 299 in FIG. 2 would indicate corresponding or substantially similar elements.

In a single drawing, similar elements may be assigned the same number. For example, both beads of the same tire may be assigned the same numeral.

For illustrative clarity, the cross-sectional views presented herein may be "near-sighted" cross-sectional views, omitting certain background lines that would otherwise be visible in a true cross-sectional view.

Figure 1A:
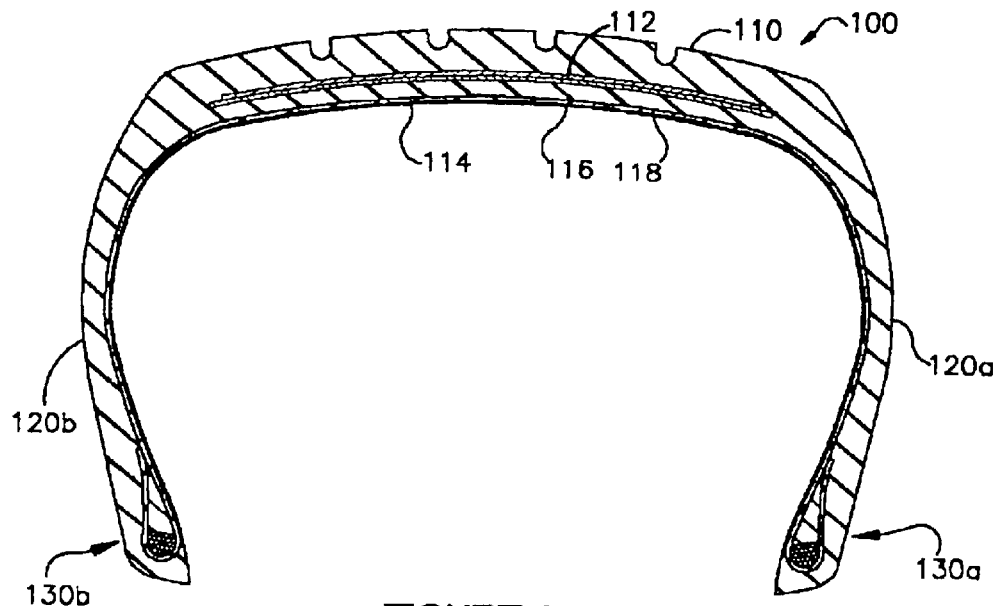
Figure 1B:
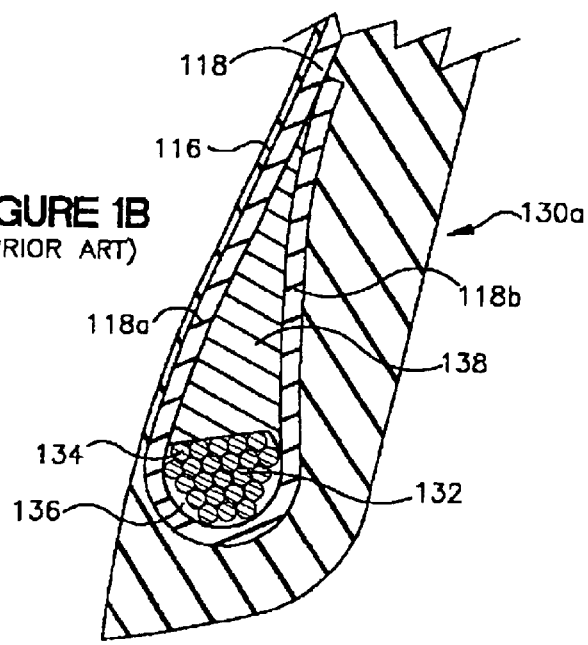
Figure 3A:
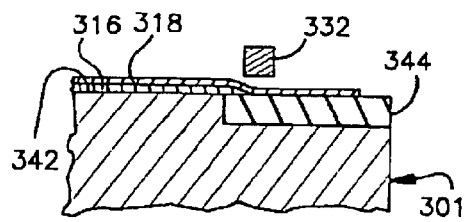
Figure 3B:
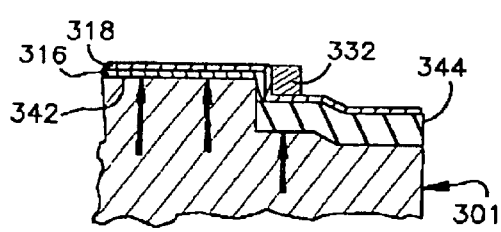
Figure 3C:
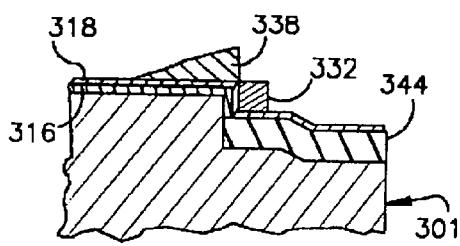
Figure 3D:
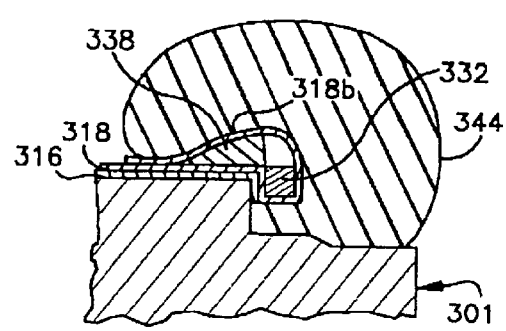
Figure 3E:
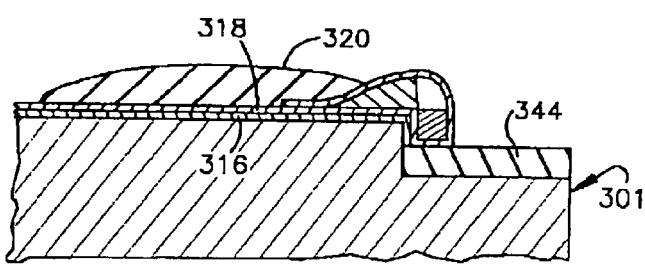
Figure 3F:
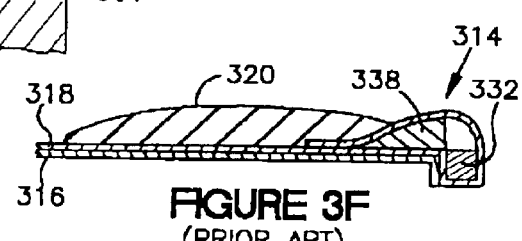
Figure 3G:
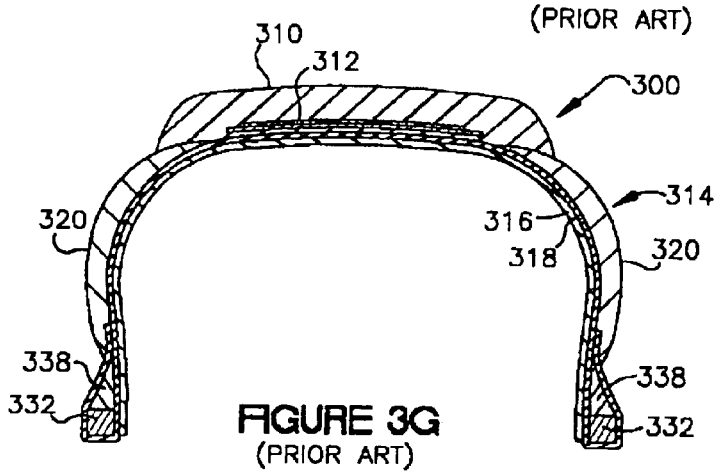
Figure 3H:
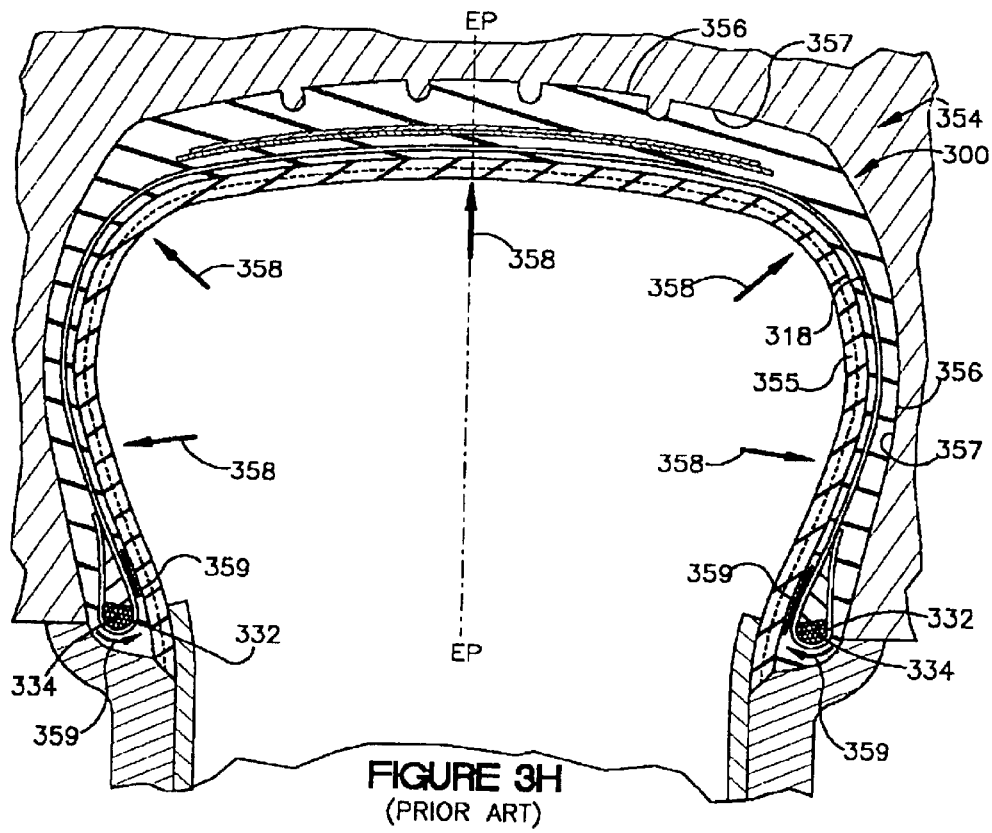
Figure 4:
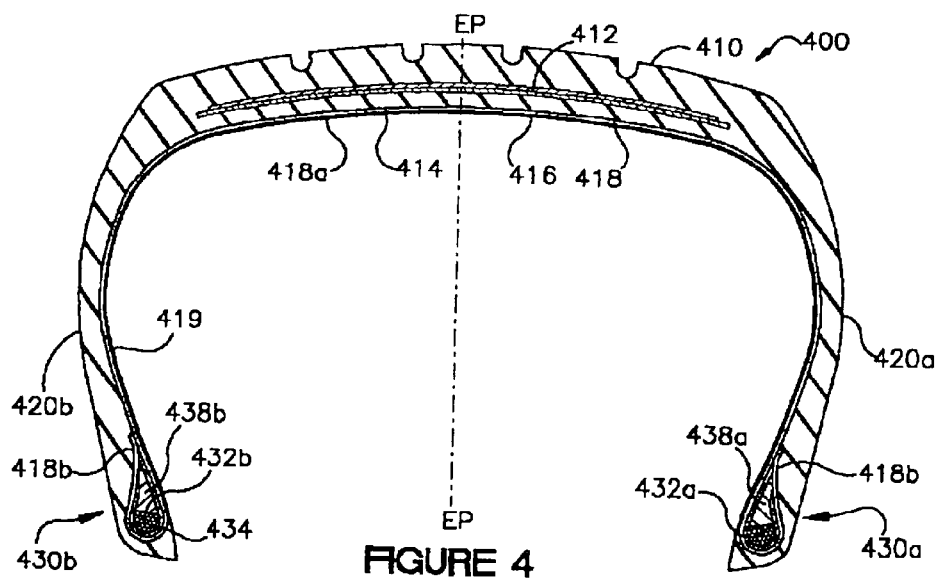
Figure 5:
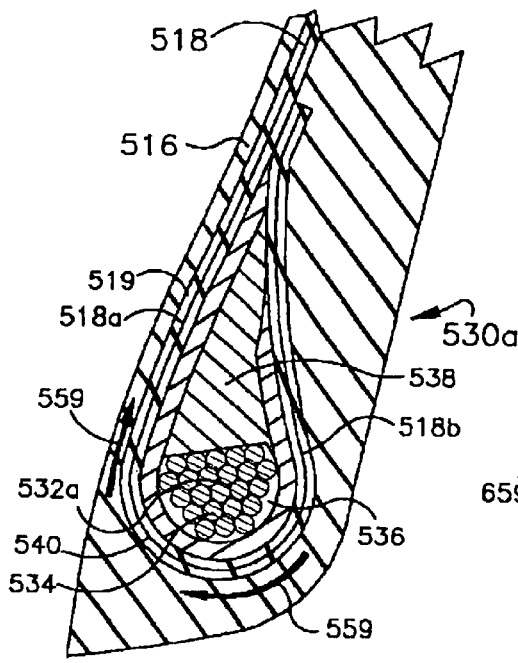
Figure 6:
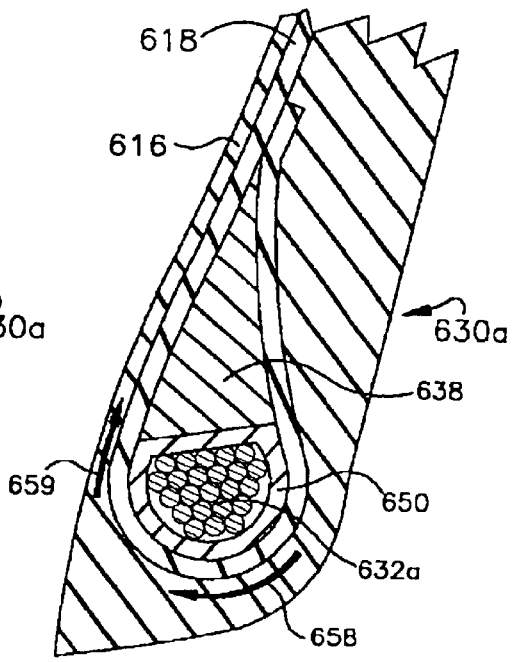
Figure 7:
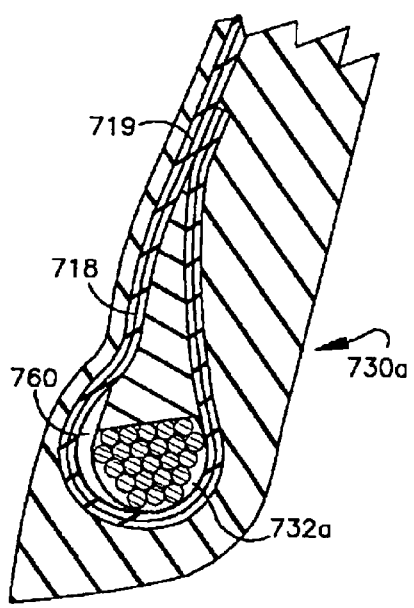
Figure 8:
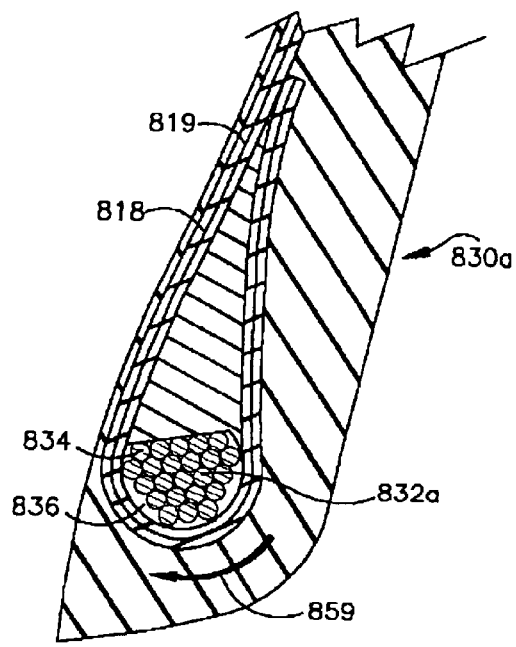
Figure 9:
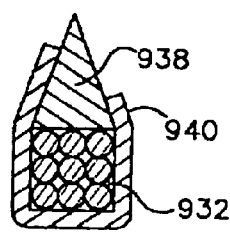
Figure 10:
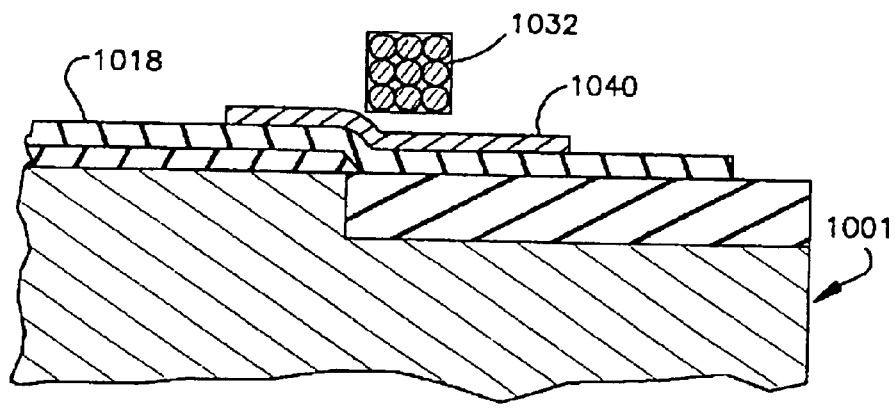
Figure 11:
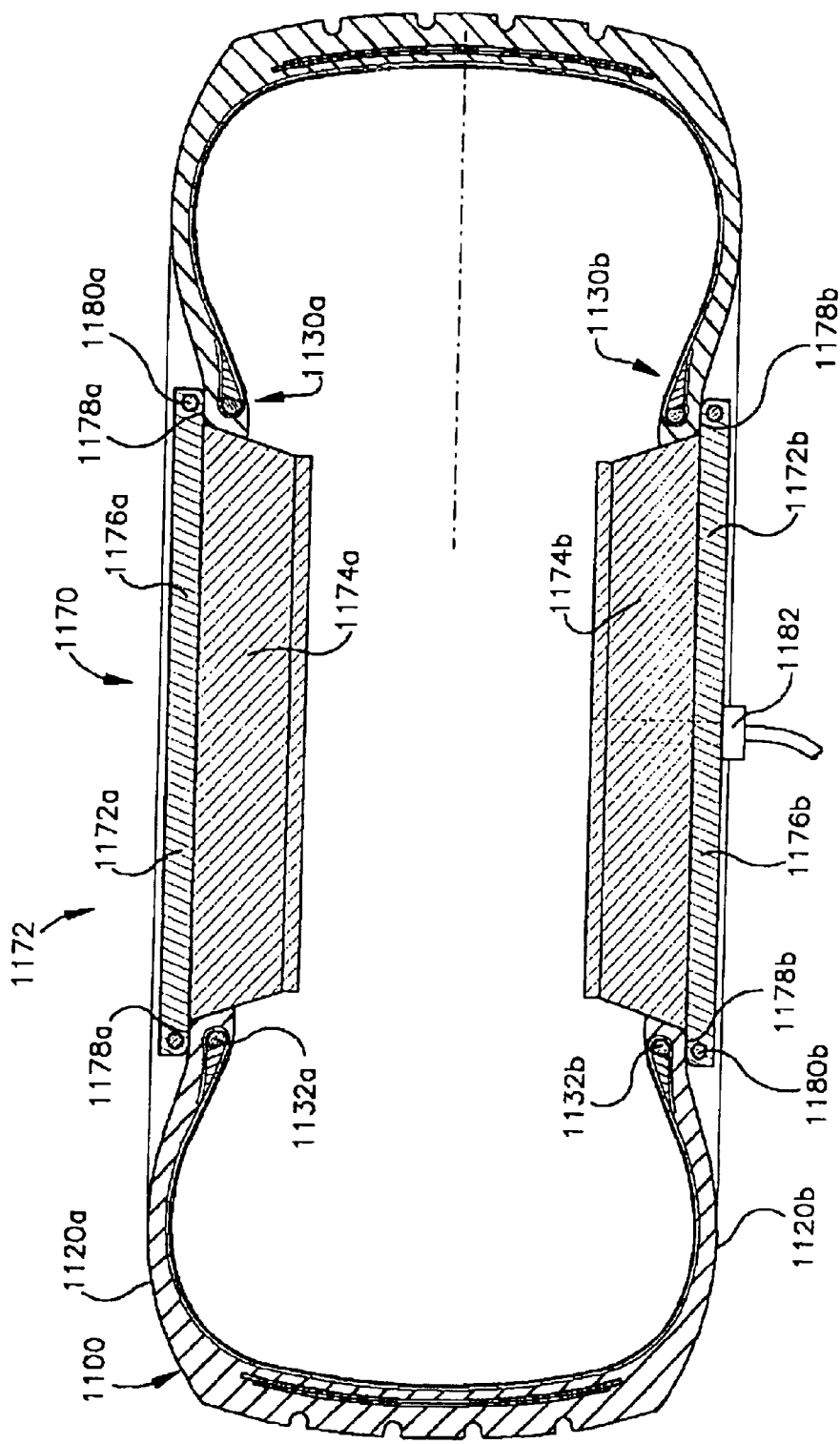

The structure, operation, and advantages of the invention will become further apparent upon consideration of the following description taken in conjunction with the accompanying drawings, wherein:

FIG. 1A is a meridional cross-section of a prior art radial ply, tire;

FIG. 1B is a meridional cross-section of the bead section of the tire of FIG. 1A;

FIGS. 2A–2H diagrammatically illustrate the steps of the prior art "positive crown" method of building a green carcass, showing a partial cross-section of the tire building drum as tire components are added;

FIGS. 3A–3G diagrammatically illustrate the steps of the prior art "negative crown" method of building a green carcass, showing a partial cross-sections of the tire building drum as tire components are added;

FIG. 3H is a diagrammatic cross-section of the tire of the present invention in a curing mold;

FIG. 4 is a meridional cross-section of a radial ply tire according to a first embodiment of the present invention;

FIG. 5 is a meridional cross-section of a bead section of a tire according to a second embodiment of the present invention;zzz FIG. 6 is a meridional cross-section of a bead section of a tire according to a third embodiment of the invention;

FIG. 7 is a meridional cross-section of a bead section of a tire according to a fourth embodiment of the invention;

FIG. 8 is a meridional cross-section of a bead section of a tire according to a fifth embodiment of the invention;

FIG. 9 diagrammatically illustrates one of the steps of the "positive crown" method of building a green carcass, according to the present invention;

FIG. 10 diagrammatically illustrates one of the steps of the "negative crown" method of building a green carcass, according to the present invention; and FIG. 11 illustrates a pre-cure uniformity apparatus according to the present invention.

DEFINITIONS

Directions

"Axial" and "lateral" refer to the direction parallel to the tire's rotational axis.

"Radial" and "radially" refer to directions radially outward from, perpendicular to, the tire's rotational axis.

"Circumferential" means extending around a circumference, and typically around the tire's circumference.

"Meridional" refers to a tire cross-section cut along a plane that includes the tire axis.

Uniformity Characteristics

"Uniformity characteristic" is a measure of tire uniformity in a prescribed direction or plane and prescribed tire testing conditions.

"Dimensional nonuniformities" are asymmetries (nonuniformity) that are measurable when the tire is at rest.

"Dynamic nonuniformities" are asymmetries in rigidity that are manifested when the tire is centrifugally stressed while rotating.

"Radial runout" is a dimensional nonuniformity referring to the tread radius being asymmetric around its circumference (either out-of-round or not concentric around the tire axis).

"Radial force variation" is a dynamic nonuniformity referring to the tire's radial rigidity being asymmetric around its circumference, causing vertical vibration during driving.

"Axial force variation" is a dynamic nonuniformity referring to the tire's axial rigidity being asymmetric around its circumference, causing axial vibration during driving.

"Wobble" is a dimensional nonuniformity referring to the tire meridional contour being nonuniform around the tire circumference "Conicity" is a nonuniformity referring to the tread's meridional contour being asymmetric, causing a lateral force in the same lateral direction independent of the direction of tire rotation.

"Tangential force variation" is the nonuniform rotation of the tire's outer surface relative to the rotation of the tire's bead area.

Tire Components

"Apex" is a cross-sectionally triangular elastomeric filler located radially above the bead core.

"Belt structure" is two or more annular layers or plies of parallel cords, woven or unwoven, underlying the tread.

"Cord" is a reinforcement strand, including fibers, metal or fabric, with which the plies and belts are reinforced.

"Innerliner" is the air-impermeable rubber layer that forms the tire's inside surface.

"Ply" herein means "radial ply", which is a layer of synthetic or steel cords in a rubber matrix, that extend between and wraps around the tire's two beads.

"Radial ply tire" means a belted or circumferentially-restricted pneumatic tire having a radial ply.

"Shoulder" is a corner edge where the surfaces of the tread and sidewall meet

"Sidewall" is a side portion of a tire between the tread and the bead. .

DETAILED DESCRIPTION OF THE INVENTION

Prior Art Tire Construction

FIG. 1A shows a meridional cross-section of a typical conventional prior art radial ply tire 100, comprising a tread 110, a belt structure ("belts") 112 of two or more belts, and a carcass 114. The carcass 114 has an innerliner 116, at least one radial ply 118, two sidewalls 120a,120b, and two identical bead sections 130a,130b.

FIG. 1B shows a cross-section of the bead section 130a of FIG. 1A. The reference numbers of FIG. 1B match those of FIG. 1A. It should be understood that the construction of the bead section 130b (not shown) is the same as that of the bead section 130a. The bead section 130a includes a bead 132 comprised of an annular bundle of steel filaments 134 in a rubber matrix 136. The ply 118 is wrapped around the bead, forming a ply inner section 118a and a ply turnup 118b. A cross-sectionally triangular apex 138 (rubber filler) is bounded by the bead 132, the ply inner section 118a and the ply turnup 118b.

Two Prior Art Tire Building Processes

In the tire building process, there are two typical methods of building a green tire carcass ("green" meaning as yet uncured and still tacky), which differ in how the apex is affixed to the bead: 1) the "positive crown" method of building a green carcass utilizing the "pre-apexing" method of affixing the apex, and 2) the "negative crown" method of building a green carcass utilizing the "flat application of apex" method of affixing the apex.

Prior Art Tire Building: "Pre-Apexing" Method

FIGS. 2A–2H diagrammatically illustrate the steps of the conventional "positive crown" method of building a green carcass, showing a cross-section of a portion of a first stage building drum 201 as tire components are added and shaped. Although the following description is described in terms of only one side of the tire, it should be understood that the procedure applies to the other side of the tire (not shown) as well.

Figure 2A:
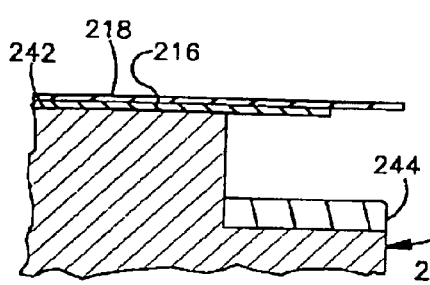
Figure 2B:
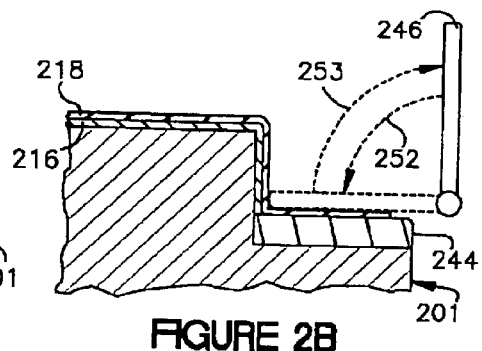
Figure 2C:
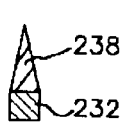
Figure 2D:
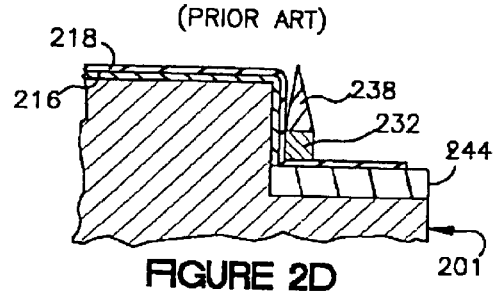
Figure 2E:
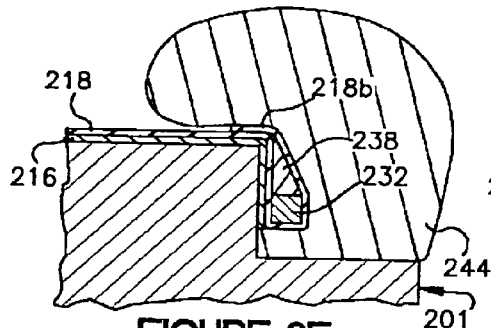
Figure 2F:
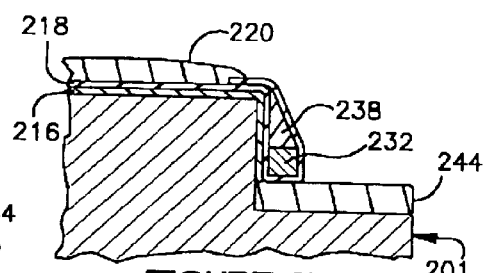
Figure 2G:
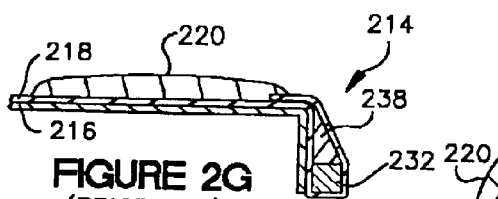

The building drum 201 has an axially-central metal surface 242, and an inflatable bladder 244 along the axially-outer portion of its surface. As shown in FIG. 2A, a length of green rubber innerliner 216 and then a length of green ply 218 (comprised of inextensible polymer or metal cords in a green rubber matrix) are wrapped around the building drum 201. Then, as shown in FIG. 2B, swab down paddles 246 swing down (as shown by arrow 252) to press the down the outer portion of the innerliner 216 and the ply 218 and then swing back up (as shown by arrow 253). Then, as shown in FIG. 2C, an apexing machine (not shown) pre-assembles (adheres) a triangular green rubber apex 238 over a bead 232 (comprising a bundle of wire filaments in a green rubber matrix). Then, as shown in FIG. 2D, the bead 232, with the apex 238 adhering to it, is spliced to form a ring and is positioned circumferentially around the ply 218. Then, as shown in FIG. 2E, the bladder 244 is inflated to turn up the radially-outer portion of the ply 218, forming a ply turnup 218b which bends around the bead 232 and the apex 238. Then, as shown in FIG. 2F, a green sidewall 220 is affixed over (adhered to) the ply 218. "Next, as shown in FIG. 2G, the resulting assembly is removed from the building drum 201. The resulting assembly, including the innerliner 216, the ply 218, the sidewall 220, the beads 232 and the apexes 238, is called a green carcass 214.

Figure 2H:
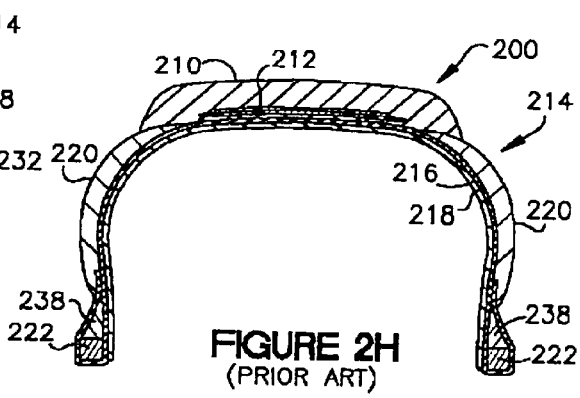

Then, as shown in FIG. 2H, the green carcass 214 is mounted on a "second stage machine" (not shown), where it is inflated ("blown up") to a toroidal shape, and its radially-outer surface is pressed into a green tread 210 and belt package 212 to form a green tire 200. Then, the green tire 200 is stitched (rolled with a roller) to remove" air pockets and to press internal surfaces together for good adhesion between adjacent materials.

Prior Art Tire Building: "Flat Application of Apex" Method

FIGS. 3A–3G diagrammatically illustrate the steps of the prior art "negative crown" (or "flat building") method of building a green carcass, entailing the "flat application of apex" method of affixing the apex onto the bead, showing a cross-section of a portion of a first stage tire building drum 301 as tire components are added and shaped. Although the following description is described in terms of only one side of the tire, it should be understood that the procedure applies to the other side of the tire (not shown) as well.

The drum 301 has an expandable metal central surface 342 around the axially-center portion of its surface, and an inflatable bladder 344 around the axially-outer portion of its surface. As shown in FIG. 3A, a length of green rubber innerliner 316 and then a green ply 318 are wrapped around the building drum 301. A bead 332 (same as bead 232 in FIG. 2B) is positioned around, but not touching, the ply 318. Then, as shown by the arrows in FIG. 3B, the central surface 342 is expanded radially outward to tighten against the ply 318, and the axially-inner portion of the bladder 344 is expanded radially outward to tighten against the bead 332. Then, as shown in FIG. 3C, an apex 338 (a substantially-triangular strip of green rubber "gum strip") is laid over the green ply 318, lying "flat" on its side (from which this apex application method gets its name), so that one of its tacky sides adheres to the tacky green ply 318. Then, as shown in FIG. 3D, the bladder 344 is inflated to turn up the radially-outer portion of the ply 318, forming a ply turnup 318b which bends around the bead 332 and the apex 338. Then, as shown in FIG. 3E, a green sidewall 320 is adhered over the ply 318. The resulting assembly, shown in FIG. 3F, including the innerliner 316, the ply 318, the sidewalls 320, the beads 332 and the apexes 338, is called a green carcass 314.

Then, as shown in FIG. 3G, the green carcass 314 is mounted on a "second stage machine" (not shown), where it is inflated ("blown up") to a toroidal shape, and its radially-outer surface is pressed against a green tread 310 and belt package 312 to form a green tire 300. Then, the green tire 300 is stitched (rolled with a roller) to remove air pockets and to press internal surfaces together for good adhesion between adjacent materials.

Molding

As shown in FIG. 3H, the green tire 300 (whether it was made by the "positive crown" or "negative crown" procedure) is mounted in a curing (vulcanization) mold 354 where a bladder 355 is inflated within the tire cavity to press the tire's outer surface 356 tightly against the mold's inner walls 357 (as illustrated by arrows 358) while the tire is vulcanized for typically 10–30 minutes at typical temperature between 120 degrees C. and 180 degrees C. and typically about 150 degrees C. In the mold 354, the tire's green rubber initially softens under heat but eventually cures (stiffens through polymerization) enough to be removed from the mold and allowed to cool outside the mold. The inflated bladder 355 stretches the ply 318 outward (as illustrated by the arrows 358) causing the tire reinforcing ply cords within the ply, which in the case of a radial tire, are parallel and extend transversely from bead to bead, to have, in a "perfect tire", a substantially uniform tension so that the tire 300 is assumed to have perfect uniformity characteristics. However, if the tire 300 is not perfectly uniform, either the length or the curvature of some of the reinforcing cords, particularly in the sidewall section will have a different shape (curvature) and/or be of a different length.

During the aforementioned shaping process and during curing, the bead's previously square cross-sectional profile may become somewhat semicircular (flat top and round bottom) as it is in the final tire. It is possible that during the molding process, the ply can slip around the beads 332 (as illustrated by arrows 359) and/or the beads can deform until the rubber "locks up" (stiffens under cure) around the ply 318 and/or the bead filaments 334.

Sources of Nonuniformity in the Tire-Making Process

Tire nonuniformity emanates from numerous factors in the tire making process, described in detail in the Background section hereinbefore. Briefly summarized, tire non-uniformity can be caused by: 1) component deformation while on rolls; 2) nonuniform placement of components on the building drum; 3) nonuniform placement of tire components on the second stage machine; 4) components shifting in the green tire; 5) mounting green tire nonuniformly in the mold; 6) ply splice; 7) ply stretching and shrinkage in the mold; and 8) uneven curing of the green tire within the mold.

First Embodiment

The present invention is directed to novel manufacturing methods and tire constructions that can reduce the occurrence of dimensional non-uniformity, i.e. a non-uniformity that is measurable when the tire is at rest, and/or a dynamic non-uniformity, i.e. a nonuniformity manifested only when the tire is rotating. The method is performed on a green tire after being blown up in the second stage machine and either prior to being mounted in the mold or after being mounted in the mold but prior to heating to the curing temperature.

In a "perfect" tire, the reinforcement cords in the carcass ply have a substantially uniform tension. Basically, this uniform tension exits in the sections of the reinforcement cords of the carcass ply located in the sidewalls, of the tire and extends substantially between the tire beads and the tire breakers. For example, referring to FIG. 4, showing a meridional cross-section of a radial ply tire 400 according to the present invention wherein the tire 400 of the present invention has a tire carcass 414, a tread portion 410, and a belt structure 412 between the tread portion 410 and the tire carcass. The tire carcass 414 includes a tire carcass reinforcement ply 418 (or "carcass ply), two bead portions 430a, 430b having beads 432a, 432b and two tire sidewalls 420a, 420b generally extending between the tread portion 410 and the bead portions 430a, 430b.

The carcass reinforcement ply 418 includes a plurality of tire reinforcing cords 419 (not shown in detail), which, in the case of a radial tire, are parallel and extend transversely between bead portions 430a and 430b. The carcass reinforcement ply 418 has a central portion 418a and two end portions ("turn-up" ends) 418b which wraps around a respective one of the beads 432a, 432b and apexes 438a, 438b, respectively, extends radially (with respect to the tire) back towards the tread portion 410 of the tire 400. The reinforcement cords 419 are selected from the group comprising Kevlar (™), steel, rayon, and nylon.

The tire 400 outwardly appears like a "standard" off-the-shelf tire, such as a bias, bias/belted and radial tires, but is quite different in that the rubber matrix of the ply coating stock of the carcass reinforcement ply 418 is formed of a special material, discussed in more detail hereinafter, that selectively permits and restricts movement or reorientation of one or more reinforcement members (cords) 419 of the tire carcass reinforcement ply before the tire has been vulcanized or cured. For example, the special material can be a thermoplastic material that becomes plastic (malleable, flowable, deformable) when its temperature exceeds its "deflection" temperature, 30 degrees C. to 190 degrees C. and preferably between 120 degrees C. and 190 degrees C., and that is non-plastic when its temperature is below the deflection temperature. The deflection temperature of the special material is selected to enable its softening without curing the surrounding green rubber and to avoid its softening when in use (when driving). An important aspect of a suitable thermoplastic material is that it can be co-curable with the surrounding rubber materials. That is, co-curable material can cross bond at its interface with the vulcanized rubber while exhibiting its thermoplastic properties in the rest of its volume when it is above the deflection temperature. Also, the special material must be mechanically capable of operating under the demanding conditions of an automobile or truck tire.

In the manufacturing process, a tire 400 can be initially heated, prior to being inserted into the tire mold, such as by placing the tire into an oven, so that the carcass ply 418 is already at the deflection temperature before the curing process starts. Alternatively, the tire can be initially heated in the tire mold up to the deflection temperature to achieve the same result. Heating the thermoplastic coating around the ply cords 419 to the deflection temperature prior to the remainder of the tire being heated to the curing temperature insures that the ply cords 419 remain unrestricted and free to adjust themselves as the tire begins to cure. Then, the cords 419 are more likely to maintain a uniform tension so that the finished tire will more likely have dimensional and dynamic uniformity.

While the tire 400 is still in the tire mold (not shown), the reinforcement cords 419 in the carcass ply 418 remain unrestricted because the ply coating material remains plastic. This allows the cords 419 to adjust themselves throughout the curing process in the tire mold, even after the surrounding rubber has locked up, so that they tend to have uniform tension when the tire is removed from the mold. In the prior art, this was not possible, because the tire components vulcanize in the tire mold at different rates, and certain portions of the cords lock up before other portions.

Second Embodiment

FIG. 5 shows a cross-section of a bead section 530a, the same as the bead section 430a of FIG. 4. It should be understood that the construction of the bead section 530b (not shown) is the same as that of the bead section 530a (compare 430a). The bead section 530a includes a bead 532a (compare 5432a) comprised of an annular bundle of steel filaments 534 (compare 434) in a rubber matrix 536. The carcass ply 518 (compare 418) is wrapped around the bead 532a, forming a ply inner section 518a (compare 418a) and a ply turnup 518b (compare 418b). While the carcass ply 518 is preferably the same as carcass ply 418, i.e. with the carcass ply cords formed of a thermoplastic, that selectively permits and restricts movement or reorientation of one or more reinforcement (cords) 519 of the tire carcass reinforcement ply before the tire has been vulcanized or cured, it is within the terms of this embodiment of the invention for the carcass ply to be constructed of a conventional curable rubber. An apex 538 is bounded by the bead 532a, the ply inner section 518a and the ply turnup 518b.

As shown in FIG. 5, the tire 500 is characterized by the annular bead section 530a having an annular thermoplastic layer 540 disposed around the cross-sectional circumference of the bead 532a ("around" not necessarily meaning around the bead's entire circumference, but possibly around a portion of its circumference as shown), between the bead and the ply 518. Preferably, as shown, the thermoplastic layer 540 can extend up (either totally or partially) one side or both sides of the apex 538, and even beyond the apex.

In the manufacturing process, a tire 500 can be initially heated, prior to being inserted into the tire mold, such as by placing the tire into an oven, so that the thermoplastic layer 540 and the carcass ply 518 (if constructed of the special thermoplastic material) is already at the deflection temperature whereby the ply coating material remains plastic. Alternatively, only the bead sections 530a, 530b are initially heated by means such as inductive heating. Moreover, the tire 500 can be preheated in the tire mold up to the deflection temperature to achieve the same result. Preheating the thermoplastic layer 540 to the deflection temperature before the remainder of the tire reaches the curing temperature increases the ability for the carcass ply to adjust itself in the bead area 530a as the remainder of the rubber begins to cure and then "lock up". That is, the thermoplastic layer 540 allows the ply 518 to slip around or move with respect to the bead 532a (as illustrated by arrows 559) when the bead section 530b is hot so that the cords 519 are more likely to maintain a uniform tension so that the finished tire will more likely have dimensional and dynamic uniformity. Moreover, if the carcass ply is of the special thermoplastic material, the cords 519 remain unrestricted and free to adjust themselves even after the surrounding rubber locks up. Then, the cords 519 are more likely to maintain a uniform tension so that the finished tire will more likely have dimensional and dynamic uniformity than a prior art tire (100 of FIG. 1A) and less likely to require a uniformity correction.

Third Embodiment

FIG. 6 shows a bead section 630a having an innerliner 616, a carcass ply 618 and a bead 632a. A thermoplastic layer 650 (corresponding to 550) is wrapped around (in contact with) the bead 632a circumference and at least a portion of the apex 638. As in the second embodiment of FIG. 5, the thermoplastic layer 650 enables the ply 618 to slip around the bead 632a (as illustrated by arrows 659) when the bead section 630b is hot, to achieve uniform ply cord tension. This beneficial effect can be enhanced by the carcass ply 618 having a coating of thermoplastic material as in the first embodiment.

Fourth Embodiment

FIG. 7 shows a bead section 730a having an annularly embedded bead 732a and a carcass ply 718 (compare 518) having ply cords 719. An annular thermoplastic layer 760 is disposed along only one side of the bead 732a, between the bead and the ply 718, and serves as a spacer to bulge a section of the carcass ply 718 away from the bead 732a. The thermoplastic layer 760 relieves nonuniform ply tension by enabling the more-tensioned ply cords 719 (or more-tensioned sections of the ply 718) to squeeze the thermoplastic layer 760 and thin it out, thereby enabling the more-tensioned ply cords 719 to straighten out to relieve stress. Wherever the thermoplastic layer 760 thins out (by being squeezed by the more-tensioned ply cords), the displaced thermoplastic material moves into circumferentially-neighboring areas where the ply cords 719 are under less tension, and buldges out those less-tensioned cords to increase their tension. In short, the thermoplastic layer 760 reduces tension of the more-tensioned ply cords 719 and increases tension of the less tensioned ply cords.

Fifth Embodiment

FIG. 8 shows a bead section 830a having an annularly embedded bead 832a and a carcass ply 818 having ply cords 819. The bead 832a is consists of steel filaments 834 embedded in a rubber matrix 836. A special thermoplastic material 836, as previously described, forms the rubber matrix 836 of the bead 832a. As in the previous embodiments, the bead can be heated either before the green tire is placed in the tire mold or while it is in the mold and before the curing temperature is reached. The thermoplastic rubber matrix 836 enables the bead 832a to deform slightly so that the ply cords 819 can move or reorient themselves (as indicated by arrow 859) to achieve a more uniform tension so that the resulting cured tire is less likely to require a uniformity correction.

Procedure
Incorporating the Thermoplastic

In the tire building process, there are various ways to incorporate the thermoplastic layer into the bead section.

In the "positive crown" method of building a green carcass (described above with FIGS. 2A–2H), the pre-assembled bead 232 and apex 238 of FIG. 2C would have a thermoplastic layer pre-assembled around at least a portion of the bead 232 and the apex 238. That is, FIG. 2C would be replaced with FIG. 9, in which a thermoplastic layer 940 (compare 540) is pre-assembled around a pre-assembled bead 932 (compare 532)and apex 938 (compare 538). The remaining tire building steps (shown in FIGS. 2D–2H) would be the same as described above. The resulting cured tire would then have a bead section like the bead section 530a of FIG. 5.

In the "negative crown" method of building a green carcass (described above with FIGS. 3A–3H), after the ply is wrapped around the drum, but before the bead is slipped into position, a flat strip of thermoplastic layer would be laid over the ply, just under the bead. In other words, FIG. 3A would be replaced with FIG. 10, wherein a bead 1032 (compare 532) is positioned over a flat strip of thermoplastic layer 1040 (compare 540) which lies over a ply 1018 on the building drum 1001. The remaining tire building steps (shown in FIGS. 3B–3H) would be the same as described above. The resulting cured tire would have a bead section like the bead section 530a of FIG. 5.

Pre-Heating the Beads with Thermoplastic

In the procedure of heating the bead sections of the second, third, fourth and fifth embodiments, the thermoplastic (whether in the bead and/or adjacent the bead within the bead section) can be "pre-heated"; (heated before the green tire is inserted into the mold) with a pre-cure uniformity apparatus 1170, as shown in FIG. 11, which illustrates the pre-cure uniformity apparatus for mounting a green tire that is about to be inserted into a tire mold. Only relevant portions of the apparatus are shown, for illustrative clarity. The apparatus 1170 includes a "split rim" 1172 comprising two rim mounting halves 1172a and 1172b. The rim mounting halves 1172a and 1172b are substantially identical and include a frustroconical tire insert portion 1174a, 1174b, respectively, and a support base 1176a, 1176b, respectively, disposed at the outwardly facing side of the insert portion. A cylindrical bead seat 1178a, 1178b provided near the intersection of the frustroconical insert portions 1174a, 1174b and the support bases 1176a, 1176b, is adapted to provide a seat in conjunction with the wall of the frustro-conical insert portions for the bead portions 1130a, 1130b (compare 430a, 430b)of the tire 1100 (compare tire 400). A pair of cylindrical induction coils 1180a, 1180b are preferably located in the support bases 1176a, 1178b, respectively, near the cylindrical bead seats 1178a, 1178b, respectively. The coils 1180a, 1180b are powered with electric AC current to inductively heat beads 1132a, 1132b, respectively, when tire 1100 is mounted on the apparatus 1170. Heat from the beads 1132a, 1132b conductively heat the material surrounding the beads. Since rubber is a poor heat conductor, the heat is relatively localized within the bead area 1130a, 1130b and does not extend up a sidewall 1120a, 1120b. While the induction coils 1180a, 1180b are shown in the support bases 1176a, 1176b below the cylindrical bead seats 1178a, 1178b, it is also within the terms of the invention to locate the induction coils at any desired location in the rims mounting halves 1172a and 1172b as long as they are capable of heating the beads 1132a, 1132b as needed. The rim mounting halves 1172a and 1172b are constructed of a non-electrically conductive material, such as plastic, so as not to interfere with the inductive field generated by the induction coils 1180a, 1180b. It is understood that heated air as required, can be provided into the cavity of the tire 1100 through the split rim 1170, such as through an air inlet passage 1182, which, in turn, is connected to a source of air.

In operation, a green tire 1100, prior to being placed in a tire mold; is delivered to the apparatus 1170 by conventional means such as a conveyor belt (not shown). The tire can be positioned between the two rim mounting halves 1172a and 1172b which are initially spaced axially apart from each other. Then by conventional means, such as hydraulic actuators (not shown), the two rim mounting halves 1172a and 1172b are moved toward each other so that the lower rim mounting half 1172b is brought into axial engagement with the lower bead area 1130b and the upper rim mounting half 1172a is brought into axial engagement with the upper bead area 1130a. If desired, the tire 1100 can be slightly inflated with air to press the bead areas 1130a and 1130b against the rim mounting halves 1172a and 1172b.

Next, the beads 1132a, 1132b are heated by induction coils 1180a, 1180b being energized with electric AC current to inductively heat the beads 1132a, 1132b, respectively. The beads 1132a, 1132b are heated to a temperature that then conductively heats the material surrounding the beads to the deflection temperature of the special material incorporated therein or thereabout, as previously discussed. The application of heat to the unvulcanized tire, to a temperature below its vulcanization temperature, immediately prior to vulcanizing of the tire in a mold, can serve to soften the adjacent thermoplastic layer to enable ply slippage to relieve localized or nonuniform cord stress, even before tire is in the mold. Since rubber is a poor heat conductor, the heat is relatively localized within the bead area. For similar results, the green tire might be heated in the tire mold for a short period of time before pressure is applied.

Thermoplastic Materials

The thermoplastic materials for use in this invention can be sulfur vulcanizable (i.e. diene-based) or semi-sulfur vulcanizable (having a limited number of sulfur vulcanizable sites) or non sulfur vulcanizable. Two or more different thermoplastic materials may be mixed together or disposed in or near each other in the same tire region. Also, two or more different thermoplastic materials may be used in different tire regions. The deflection temperature is in the range of 30 degrees C. to 190 degrees C. and preferably in the range of 121 degrees C. to 190 degrees C.

An example of a sulfur vulcanizable thermoplastic for use with this invention is a syndiotactic 1,2-polybutadiene (SPBD) that normally has more than 65% of its monomeric units in a syndiotactic 1,2-configuration, as described in U.S. Pat. No. 5,058,647, which is incorporated in its entirety by reference herein. A related reference is U.S. Pat. No. 4,790, 365, incorporated in its entirety by reference herein. Another sulfur vulcanizable thermoplastic for use with this invention is a trans-polyoctenamer. These elastomers can be used alone or as a mixture with other diene-based elastomers and/or resins which are hereinafter described.

Semi-sulfur curable resins might be AB and ABA block copolymers, where A represents blocks of polystyrene, poly (alphamethyl styrene) or poly(t-butylstyrene), and B represents blocks of either polyisoprene or polybutadiene Such block copolymers may be, for example, SBS or SIS block copolymers, as described in U.S. Pat. No. 5,756,589, incorporated in its entirety by reference herein. Semi-sulfur curable resins would normally be used in a mixture with sulfur curable diene-based elastomers, such as in a range of 5–95 phr and preferably 10–40 phr of the resin in the elastomer(s).

Non-curable resins for use with this invention might be polymers of alphaolefins such as polyethylene, polypropylene, polybutene and copolymers of alphaolefins with minor amounts of other mono-olefins such as 1-hexene and 1-octene. Other non-curable resins might be hydrocarbon, phenol/acetylene and rosin derived resins. Such resins are described in U.S. Pat. No. 5,901,863, incorporated in its entirety by reference herein. Non-curable resins might be used as a blend in mixtures of conjugated diene based sulfur curable elastomers in the amount of, for example, 5–25 phr.

The invention has been illustrated and described in a manner that should be considered as exemplary rather than restrictive in character—it being understood that only preferred embodiments have been shown and described, and that all changes and modifications that come within the scope of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. A method of manufacturing a pneumatic tire with improved tire uniformity; the tire having a pair of spaced beads in bead portions, and at least one carcass ply extending between the beads and consisting of reinforcement cords embedded in a rubber matrix; the method being characterized by the steps of:
   a) forming the rubber matrix from a matrix material that is a thermoplastic having a deflection temperature above which the thermoplastic matrix material is plastic, and below which the thermoplastic matrix material is non-plastic;
   b) heating the thermoplastic matrix material to a temperature above the deflection temperature to render the thermoplastic matrix material plastic before the tire begins to cure and thereby to permit one or more of the reinforcement cords to be unrestricted and free to reorient themselves relative to other materials or components of the tire;
   c) curing the tire in a tire mold while the thermoplastic matrix material remains plastic so that the reinforcement cords remain unrestricted and free to reorient themselves during the curing within the mold so that the reinforcement cords maintain or attain a uniform tension; and
   d) cooling the thermoplastic matrix material to a temperature below the deflection temperature to render the thermoplastic matrix material non-plastic and thereby to restrict further reorientation of the one or more reinforcement cords subsequent to removing the tire from the tire mold.

2. Method, according to claim 1, wherein:
   the deflection temperature is above 30 degrees C.

3. Method, according to claim 2, wherein:
   the deflection temperature is between 121 degrees C. and 190 degrees C.

4. Method, according to claim 1, wherein the step b) of heating the thermoplastic matrix material includes:
   heating the tire in the tire mold to above the deflection temperature to permit reorientation of the one or more reinforcement cords as the tire begins curing within the mold.

5. Method, according to claim 1, wherein:
   the thermoplastic matrix material is selected from the group consisting essentially of sulfur vulcanizable, semi-sulfur vulcanizable and non sulfur vulcanizable thermoplastics, so that the thermoplastic matrix material is co-curable with surrounding rubber materials of the tire, wherein:
      co-curing means cross bonding at interfaces of the thermoplastic matrix material and the surrounding rubber material such that the thermoplastic matrix material maintains thermoplastic properties in the rest of its volume even after cross bonding is completed and the surrounding rubber material is vulcanized.

6. Method, according to claim 1, wherein:
   the reinforcement cords are selected from the group comprising aramid, steel, rayon, and nylon.

7. Method, according to claim 1, including the step of:
   forming at least a portion of the bead portions from the thermoplastic matrix material.

8. Method, according to claim 7, wherein:
   the thermoplastic matrix material is disposed between a bead and an adjacent portion of the carcass ply.

9. Method, according to claim 8, wherein:
   the step b) of rendering the thermoplastic matrix material plastic permits the one or more reinforcement cords to slip with respect to a bead.

10. A method of manufacturing a pneumatic tire for improving one or more tire uniformity characteristics, the tire having a pair of spaced beads in bead portions, and at least one carcass ply having a plurality of reinforcement cords and extending between the beads; the method being characterized by the steps of:
    a) forming at least a portion of the bead portions from a thermoplastic material having a deflection temperature above which the thermoplastic material is plastic and below which the thermoplastic material is non-plastic;
    b) heating the thermoplastic material to a temperature above the deflection temperature to render the thermoplastic material plastic before the tire begins to cure and thereby to permit the plurality of reinforcement cords to be unrestricted and free to reorient themselves relative to other reinforcement cords or other components of the tire;
    c) curing the tire in a tire mold while the thermoplastic material remains plastic so that one or more of the plurality of reinforcement cords can reorient themselves during the curing within the mold so that the plurality of reinforcement cords maintain or attain a uniform tension; and d) cooling the thermoplastic matrix material to a temperature below the deflection temperature to render the thermoplastic matrix material non-plastic and thereby to restrict further reorientation of the one or more reinforcement cords subsequent to removing the tire from the tire mold.

11. Method, according to claim 10, wherein the step b) of heating the thermoplastic material includes:

heating portions of the tire to above the deflection temperature to permit reorientation of the one or more reinforcement cords.

12. Method, according to claim 11, wherein:

reorienting of the one or more reinforcement cords includes slipping of the one or more reinforcement cords with respect to the bead.

13. Method, according to claim 12, wherein:

the thermoplastic material has a deflection temperature between 30 degrees C. and 190 degrees C.; and the thermoplastic material is selected from the group consisting essentially of sulfur vulcanizable, semi-sulfur vulcanizable and non sulfur vulcanizable thermoplastics, so that the thermoplastic material is co-curable with surrounding rubber materials of the tire, wherein:

co-curing means cross bonding at interfaces of the thermoplastic material and the surrounding rubber material such that the thermoplastic material maintains thermoplastic properties in the rest of its volume even after cross bonding is completed and the surrounding rubber material is vulcanized.

14. Method, according to claim 13, including:

disposing the thermoplastic material at least partially around the beads to form a thermoplastic layer.

15. Method, according to claim 10, further including:

forming the at least one carcass ply from a plurality of reinforcement cords embedded in a matrix material that is a thermoplastic having a deflection temperature above which the thermoplastic matrix material is plastic, and below which the thermoplastic matrix material is non-plastic.

16. Method, according to claim 1, wherein the step b) of heating the thermoplastic matrix material includes:

before placing the tire in the tire mold, heating the thermoplastic matrix material to above the deflection temperature to permit reorientation of the one or more reinforcement cords before the tire begins curing.

17. Method, according to claim 11, wherein:

at least a part of a bead portion is heated to above the deflection temperature.

* * * * *